United States Patent [19]

Helfer et al.

[11] Patent Number: 4,647,419
[45] Date of Patent: Mar. 3, 1987

[54] METHOD AND APPARATUS FOR PRODUCING A FLASH FREE PIPETTE

[75] Inventors: Jeffrey L. Helfer, Webster; Robert R. Osburn, Rochester, both of N.Y.

[73] Assignee: Eastman Kodak Company, Rochester, N.Y.

[21] Appl. No.: 786,019

[22] Filed: Oct. 10, 1985

[51] Int. Cl.$^4$ .............................................. B29C 45/34
[52] U.S. Cl. ...................................... 264/328.9; 249/64; 249/141; 249/145; 425/577; 425/468; 425/DIG. 224
[58] Field of Search ..................... 249/63, 64, 141, 144, 249/145, 151, 184; 425/577, 468, DIG. 224; 264/328.9

[56] References Cited

U.S. PATENT DOCUMENTS 4,126,291 11/1978 Gilbert et al. .......................... 249/63
4,165,062 8/1979 Mitchell .............................. 249/141
4,287,155 9/1981 Tersteeg et al. ...................... 422/64
4,340,390 7/1982 Collins et al. .......................... 436/54

Primary Examiner—Jay H. Woo
Assistant Examiner—Timothy W. Heitbrink
Attorney, Agent, or Firm—Dana M. Schmidt

[57] ABSTRACT

An apparatus and method for molding plastic pipettes are disclosed, using an upper and lower mold plate that define a cavity which forms the outer surface of the pipette. The mold parting line of the upper and lower mold plates is located at a position between the ends of the cavity to prevent "radial" flash at the aperture of the pipette. "Axial" flash at the aperture of the pipette is prevented by a lower core pin in the lower mold plate. The lower core pin extends into the cavity and defines the dimensions of the aperture of the pipette. The extension of the lower core pin from the lower mold plate minimizes tool wear at the aperture and makes the alignment of the upper and lower mold plates at the orifice less critical.

3 Claims, 4 Drawing Figures

METHOD AND APPARATUS FOR PRODUCING A FLASH FREE PIPETTE

FIELD OF THE INVENTION

This invention relates to apparatus and a method for molding plastic pipettes. More specifically, the invention provides a plastic pipette mold that substantially eliminates radial and axial flash at the tip of the pipette.

BACKGROUND OF THE INVENTION

Analyzers have been provided for the detection of the concentration of liquid analytes using as analysis means, so-called dried test elements that contain within themselves the necessary reagents to permit such detection. Examples of such analyzers are described in U.S. Pat. Nos. 4,287,155 and 4,340,390. As is evident in the aforesaid U.S. Pat. No. 4,340,390, the preferred method of dispensing a small quantity of test fluid onto the test element is to transfer at least that quantity to be dispensed, such as by aspiration, from a first container into a temporary storage container called a disposable pipette or dispensing "tip". Examples are shown in U.S. Pat. No. 4,347,875. The fluid is transferred from the tip to the test element by pressurizing the tip by amounts effective to dispense a small quantity (typically 10 $\mu$l) of liquid onto the test element.

Perfusion has been an occasional but persistent problem during the dispensing operation of the aforementioned analyzers. "Perfusion" refers to the movement of dispensed fluid up the exterior surface of the tip, rather than down onto the test element designed to receive the fluid, during the dispensing operation. Perfusion is a problem because fluid contacting the exterior surface of the tip alters the volume of fluid that is subsequently dispensed onto the test element. In some cases, perfusion can result in no fluid being dispensed on the test element. Studies have been conducted to locate the cause of the perfusion problem and provide a solution. Although it appears there may be a number of contributing factors which cause perfusion, it has been found that "flash" left at the end of the tip during the molding operation contributes significantly to the perfusion problem.

Flash is a small amount of plastic material that is left near the aperture of the tip due to wear of the molding tool or contaminates being present in the mold. Due to the small diameter of the tip aperture (e.g., about 0.5 mm), even a small amount of flash can divert the dispensed fluid and cause it to adhere to the side of the tip. Flash can also cause additional fluid to cling to the side of the tip during the withdrawal of the tip from the container holding the sample fluid, which causes additional fluid to be drawn to the side of the tip during the dispense operation.

Molding apparatus presently used to produce the tips are composed of an upper and lower mold plate. Only the upper mold plate has a cavity that defines the outer surface of the dispensing tip. A telescoping core pin fits into the cavity and extends from the upper plate into the lower mold plate when the mold is closed. The telescoping core pin defines the inner surface and aperture size of the dispensing tip. Surface contaminants on the upper or lower mold plate surface can prevent the surfaces from properly interfacing and cause a small amount of plastic material to extend radially from the tip aperture along the mold parting line, forming "radial" flash. "Axial" flash is formed due to the wear of the telescoping core pin which allows a small amount of plastic material to extend axially from the tip aperture into the lower mold plate.

The problem then, which is the basis for the present invention, is to eliminate flash from the dispensing tip in order to prevent perfusion.

SUMMARY OF THE INVENTION

In order to substantially prevent flash at the tip aperture of a dispensing container, there is provided a mold apparatus having an upper and a lower mold plate which together define the cavity that defines the container. Radial flash is eliminated by providing an upper core pin and a lower core pin that telescopes into the upper core pin at a location inside the cavity. The lower core pin is dimensioned to form the tip aperture and is fixed in the lower mold plate. Wear of the core pins therefore occurs inside the cavity and not at the aperture of the tip, thus preventing axial flash from occurring at the tip.

More specifically, in accord with one aspect of the invention there is provided a mold for forming an apertured container substantially free of flash at the aperture, the mold comprising:

(a) an upper mold plate and a lower mold plate, the upper plate defining a cavity which forms at least a portion of the outer surface of the apertured container, the plates having a combined parting line extending radially away from the cavity, (b) an upper core pin which extends into the cavity and defines a portion of the inner surface of the apertured container, (c) a lower core pin extending from the lower mold plate so as to telescope into the upper core pin at a location inside the cavity, the lower core pin being dimensioned to form the aperture of the container between the lower core pin and the lower mold plate, and (d) means for venting gas from the cavity.

In accord with another aspect of the invention, there is provided a method of molding an apertured container substantially free of flash at the aperture, the method comprising the steps of:

(a) closing an upper and lower mold plate to define a cavity that forms the surfaces of the apertured container, (b) inserting an upper and a lower core pin into the cavity from the upper and the lower plates, respectively, the pins interfacing at a location between the ends of the cavity, the lower core pin being dimensioned to define the aperture of the container and to vent gas between the lower core pin and the lower mold plate, and (c) injecting molten plastic into the cavity to form the apertured container.

Thus, it is an advantageous feature of the invention that a dispensing container can be molded with an aperture that is substantially free of flash.

It is a related advantageous feature that such a container is produced in a manner which lessens the likelihood of perfusion during use.

BRIEF DESCRIPTION OF THE DRAWINGS

With the above as background, reference should now be made to the following figures for a detailed description of the invention.

DETAILED DESCRIPTION

Figure 1:
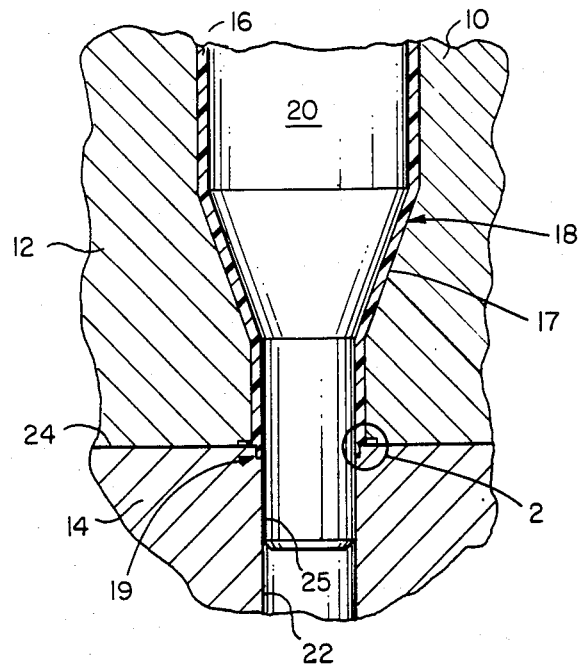
FIG. 1 is a fragmentary cross section of a prior art mold apparatus.

Referring now to FIG. 1, a cross sectional view of a prior art mold apparatus 10 is shown. The mold apparatus 10 has an upper mold plate 12 and a lower mold plate 14. A cavity 16 in the upper mold plate 12 defines the outer surface 17 of the molded dispensing tip 18. A telescoping core pin 20 fits into the cavity 16 and defines the inner surface and aperture 19 of the dispensing tip 18. The telescoping core pin 20 extends into the gas vent hole 22 provided in the lower mold plate 14 when the mold 10 is closed.

Figure 2:
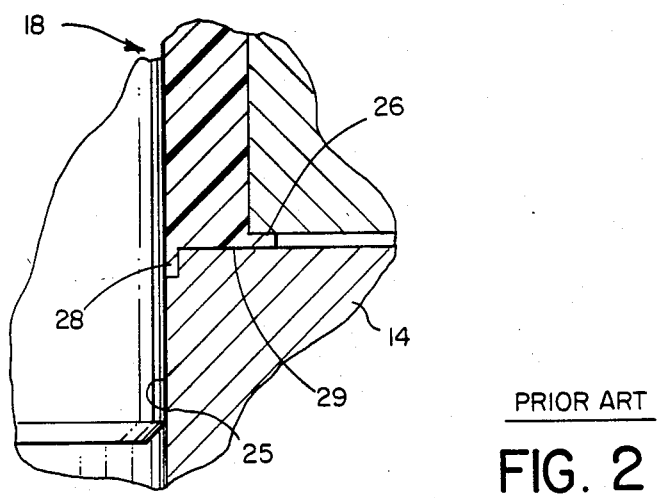
FIG. 2 is an enlargement of the portion of FIG. 1 marked "2"

A gas vent clearance is provided between the upper mold plate 12 and lower mold plate 14 to vent gasses displaced by molten plastic injected into the cavity. The clearance is too small to normally allow plastic material to flow out along the mold parting line 24. However, if the mold surfaces are contaminated, for example by dust or plastic fragments, the mold surfaces do not interface properly and plastic flows along the mold parting line 24 causing radial flash at a point 26, FIG. 2.

Similar gas venting clearances are provided at 25, between telescoping core pin 20 and lower mold plate 14. Difficulties in properly aligning the telescoping core pin 20 and lower mold plate 14 when the mold 10 is closed can cause a gap large enough to allow plastic to flow along the gas vent line and produce axial flash at a point 28. Normal tool wear, as the core pin 20 is inserted and removed from the lower mold plate 14, will over time cause the clearance provided for gas venting to increase, causing the axial flash at point 28.

It will be appreciated that both flashes 26 and 28 are undesirable. That is, tip 18 is formed with a dispensing platform 29, FIG. 2, that is intended to be perfectly flat and sharp-edged. If flash 26 or 28 is present, when tip 18 is withdrawn from a container used for aspiration, either or both flash tend to encourage exterior liquid to remain pendant from or adjacent to platform 29. It is this exterior liquid that interferes with the predicted dispensing volume.

Figure 3:
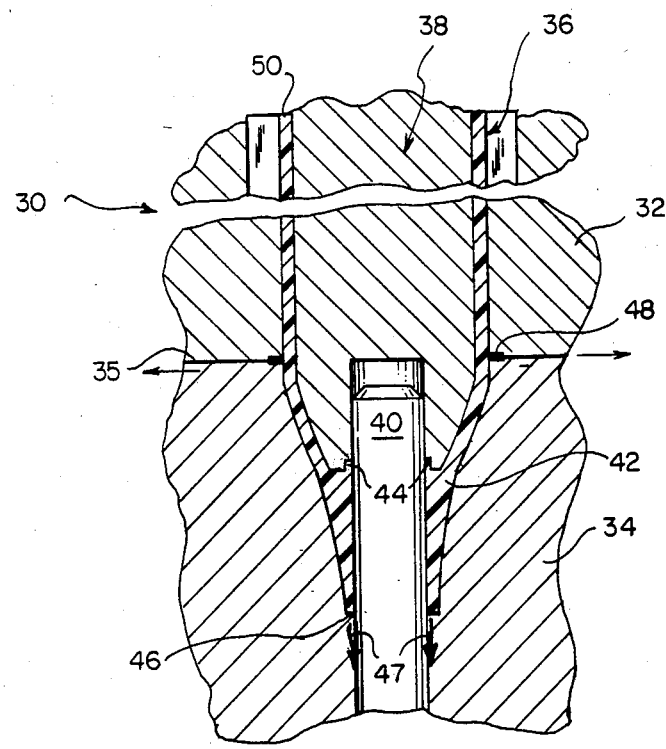
FIG. 3 is a fragmentary cross section of a mold apparatus incorporating the present invention.

Referring now to FIG. 3, a cross section of a mold apparatus 30 incorporating a presently preferred embodiment of the instant invention is shown. The mold apparatus 30 consists of a upper mold plate 32 and lower mold plate 34 meeting at a mold parting line 35. Both plates form a cavity 36 that defines the outer surface of a molded tip 42. An upper core pin 38 which is inserted into the upper mold plate 32 and a lower core pin 40 which is attached to the lower mold plate 34, define the inner surface of the molded dispensing tip 42. The lower core pin 40 also defines the size of the tip aperture 46.

Gas venting clearance is provided as shown by arrows 47, between the lower core pin 40 and the lower mold plate 34 in a conventional manner, using precisely machined clearances. Axial flash at the tip aperture is prevented by fixedly mounting the lower core pin 40 in the lower mold plate 34. Thus, wear at the gas vent area does not occur because the lower pin 40 is not being moved in and out of the lower mold plate 34. Tool wear will occur at a point 44 where the lower core pin is inserted into the upper core pin 38. Any axial flash that occurs at this point, however, will not effect the performance of the dispensing tip 42 as the flash is located away from the tip aperture and will not contribute to perfusion.

Radial flash is also prevented at the aperture of the dispensing tip 42 by locating the mold parting line 35 removed from the tip aperture, preferably, between the two tip ends 46 and 50 of the tip, FIG. 3. Therefore, any radial flash that occurs at point 48 due to contamination of the mold surfaces will not contribute to the problem of perfusion.

The finished tip is released from its mold components by conventional techniques, not shown and well understood in the art.

Figure 4:
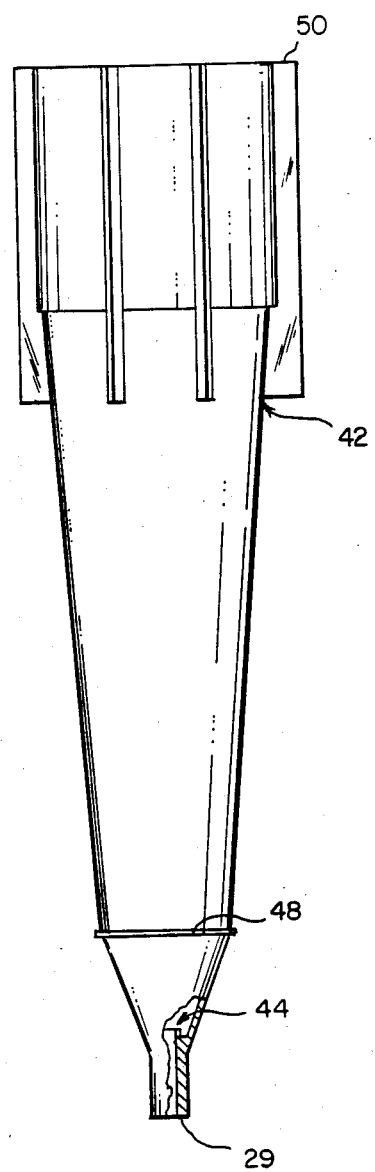
FIG. 4 is a partially broken away elevational view of a dispensing tip produced from the apparatus shown in FIG. 3.

A dispensing tip produced from the mold apparatus in FIG. 3 is shown in FIG. 4. The walls can be cylindrical, or tapered as shown in FIG. 4. Generally, the tip is similar to that shown in the aforesaid U.S. Pat. No. 4,347,875. However, as shown in the drawing, platform 29 of the dispensing tip is free of axial or radial flash. Instead, flash 44 and 48 are located as described above. (The amount of flash has been exaggerated in FIG. 4, for clarity.)

Alternatively, the mold construction can be as shown in FIG. 3, except that the mold parting line 35 is moved all the way (not shown) to the upper end 50 of the tip. In such case, the radial flash 48 will occur at that end, but little adverse effect can be expected from such a location.

The invention has been described in detail with particular reference to certain preferred embodiments thereof, but it will be understood that variations and modifications can be effected within the spirit and scope of the invention.

What is claimed is:

1. A mold for forming a container, said container having an aperture substantially free of flash, said mold comprising:
    (a) an upper mold plate and a lower mold plate, said upper mold plate defining a cavity which forms at least a portion of an outer surface of said container, said mold plates having a combined parting line extending radially away from said cavity at a location that is removed from the plane of said aperture,
    (b) an upper core pin which extends from said upper mold plate and into said cavity, said upper core pin defining a portion of an inner surface of said container,
    (c) a lower core pin extending from said lower mold plate so as to telescope into said upper core pin at a location inside said cavity, said lower core pin being dimensioned to form said aperture of said container between said lower core pin and said lower mold plate, and
    (d) means for venting gas from said cavity.

2. A mold for forming a container, said container having an aperture substantially free of flash, said mold comprising:
    (a) an upper mold plate and a lower mold plate, said upper mold plate defining a cavity which forms at least a portion of an outer surface of said container, said mold plates having a combined mold parting line extending from said cavity at a location that is removed from the plane of said aperture and a gas vent extending radially away from said cavity,
    (b) an upper core pin which extends from said upper mold plate and into said cavity, said upper core pin defining a portion of an inner surface of said container, and (c) a lower core pin rigidly mounted to said lower mold plate, said lower core pin telescoping into said upper core pin at a location inside said cavity, said lower core pin being dimensioned to form said aperture of said container and to vent gas between said lower core pin and said lower mold plate.

3. A method of molding a container having an aperture that is free of flash, said method comprising the steps of:

(a) closing an upper mold plate and lower mold plate to meet at a parting line and define a cavity that forms surfaces of said container, said parting line being removed from the plane of said aperture, (b) inserting an upper core pin and a lower core pin into said cavity from said upper and said lower mold plates, respectively, said pins interfacing at a location between ends of said cavity, said lower core pin being dimensioned to define said aperture of said container and to vent gas between said lower core pin and said lower mold plate, and (c) injecting molten plastic into said cavity to form said container.

* * * * *